United States Patent [19]

Sundquist

[11] Patent Number: 4,539,822
[45] Date of Patent: Sep. 10, 1985

[54] VIBRATION ISOLATOR FOR CRYOPUMP

[75] Inventor: Mark L. Sundquist, Madison, Wis.
[73] Assignee: National Electrostatics Corporation, Middleton, Wis.
[21] Appl. No.: 584,116
[22] Filed: Feb. 27, 1984
[51] Int. Cl.³ .............................................. B01D 8/00
[52] U.S. Cl. ...................... 62/55.5; 55/269; 62/268; 62/295; 248/638; 417/901
[58] Field of Search ............ 62/55.5, 100, 268, 514 R, 62/295; 55/269; 417/901; 248/636, 638

[56] References Cited

U.S. PATENT DOCUMENTS

| | | | |
|---|---|---|---|
| 3,609,992 | 10/1971 | Cacheux | 62/514 R |
| 3,721,101 | 3/1973 | Sheppard et al. | 62/55.5 |
| 3,742,729 | 7/1973 | Zulliger | 62/514 R |
| 3,894,403 | 7/1975 | Longsworth | 62/514 R |
| 4,216,505 | 8/1980 | Grant et al. | 248/636 |
| 4,363,217 | 12/1982 | Venuti | 62/295 |
| 4,394,819 | 7/1983 | Averill | 62/514 R |

Primary Examiner—Ronald C. Capossela
Attorney, Agent, or Firm—Isaksen, Lathrop, Esch, Hart & Clark

[57] ABSTRACT

A vibration isolator is disclosed to mount a cryopump expander module or other vibrating equipment on a vacuum housing. The isolator includes a welded metal bellows which both forms a vacuum-tight passage and acts as an isolating spring, and a plurality of elastomeric isolators which clamp the oscillations of the bellows.

6 Claims, 3 Drawing Figures

VIBRATION ISOLATOR FOR CRYOPUMP

FIELD OF THE INVENTION

The present invention relates to vibration isolators in general, and, in particular, to a vibration isolator suitable for use in high-vacuum equipment to isolate vibrations from a cryopump from other components of the vacuum equipment system.

BACKGROUND OF THE INVENTION

In creating high vacuum environments for a variety of production and experimentational purposes, mechanical vacuum pumps are used to reduce the vacuum in an enclosed vacuum chamber down to a certain level. Beyond that level, beginning at a range of perhaps $1 \times 10^{-3}$ torr, it is common practice in the technology today to use a cryopump to further reduce the vacuum inside of a chamber. A cryopump is, in essence, a cryogenic freezer which causes free gases inside of a vacuum chamber to solidify, because of the extremely cold surface temperature of the panels chilled by the cryopump, typically to a temperature of less than 10 degrees Kelvin. Thus the cryopump lowers the gas pressure inside of a chamber by freezing the gases out of the chamber. Cryopumps are typically operated in a vacuum range of $1 \times 10^{-3}$ to $1^{-12}$ torr. While cryopumps have no moving parts inside of the vacuum chamber, they do include a closed-loop refrigeration system for creating the cryogenic cold conditions, and, although the compressors are commonly remotely located from the vacuum equipment, the expander module containing the cooled plates which must be exposed inside of the vacuum chamber must be located on the chamber. This expansion module is vibrated by the force of the gases compressed by the compressor and pumped to the expander module. This vibration can be detrimental to the maintenance of a high vacuum within the equipment since the vibration can induce vacuum leakage in couplings which are insufficiently tightly sealed throughout the rest of the equipment and can also cause oscillation or movement in the target or beams being utilized inside of the vacuum.

One example is known in the prior art of a device specifically intended to isolate and damp vibration from a cryopump while connecting the cryopump to suitable vacuum equipment. That example is described in U.S. Pat. No. 4,363,217. In the device disclosed in that patent, the cryopump expander module must hang beneath the vacuum equipment to be pumped, as for example an electron microscope, by a metal bellows which is specifically adapted to isolate the vibrations from the expander module of the cryopump. Vibration damping isolators in the form of resilient lateral motion restraining devices surround the module to keep the expansion module in a linear orientation to confine the movement of the module. This system suffers from the inherent disadvantage in that to utilize it the expander module must be hung underneath the vacuum chamber. Since this physical arrangement is not always necessary or convenient, this system is not desirable for some environments.

Other examples of systems designed to isolate vibration in temperature sensitive equipment are disclosed in U.S. Pat. No. 4,394,819, which discloses a horizontal coupling arrangement for a mechanical vacuum unit used to cryogenetically cool sensitive equipment, and in U.S. Pat. No. 3,894,403, which discloses a refrigeration transfer mechanism designed to reduce vibration transfer while allowing thermal coupling. Another vibration dampening mechanism for a heat coupling system is illustrated in U.S. Pat. No. 3,742,729. U.S. Pat. Nos. 3,609,992 and 3,721,101 disclose methods for isolating equipment at extremely low cryogenetic temperatures. The disclosure of U.S. Pat. No. 4,216,505 illustrates a transducer head vibration dampening apparatus which includes a metallic mass and a frictionally engaged transducer head structure.

SUMMARY OF THE INVENTION

The present invention is summarized in that a vibration isolator for mounting a cryopump expander module includes a pair of space coupling flanges shaped and sized to be easily mounted on a vacuum chamber assembly, the flanges each having a circular port formed therethrough; a metal bellows assembly extending between the flanges to form a vacuum-tight passage through the isolator, the welded metal bellows acting as a spring isolator and coupling between the flanges; and a plurality of high damping elastomeric isolators connecting the flanges in parallel with the welded metal bellows to both hold the flanges apart and to damp the oscillation of the bellows so that vibrations from the cryopump are not passed through the isolator to the vacuum chamber.

It is an object of the present invention to provide an expedient and effective vibration isolator to isolate a cryopump expander module from vacuum chamber equipment upon which it is mounted.

It is another object of the present invention to construct a vibration isolator for a cryopump which will allow the cryopump expander module to be located above or below the vacuum chamber, whichever is more desirable in a given installation, and which will be adaptable for use with any type of cryopump regardless of physical configuration.

It is yet another object of the present invention to provide such a vibration isolator which is simple to construct and yet efficient in its operation.

Other objects, advantages, and features of the present invention will become apparent from the following specification when taken in conjunction with the drawings.

DESCRIPTION OF THE PREFERRED EMBODIMENT

Figure 1:
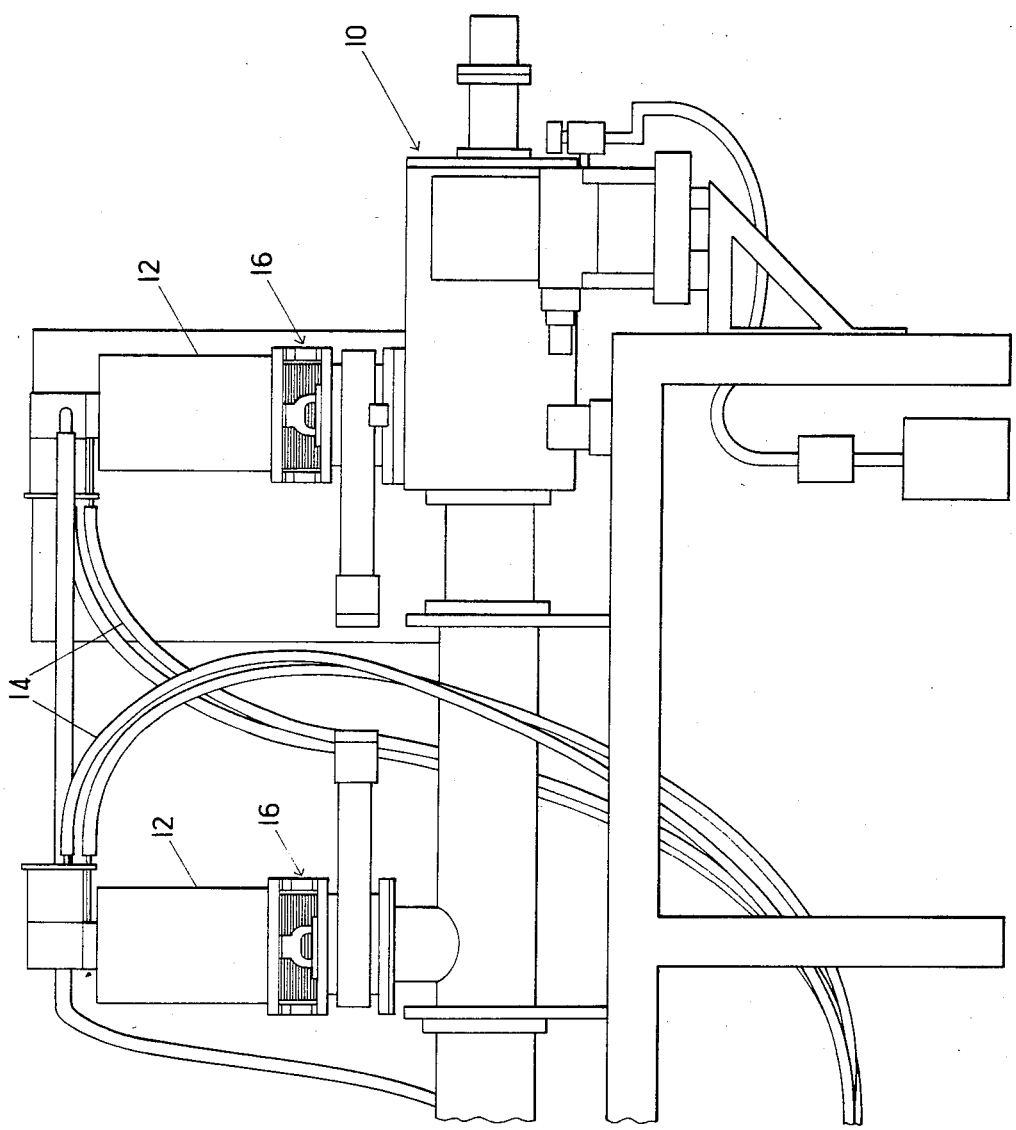
FIG. 1 is a side elevational view of an end station assembly of an ion implantation system which includes a pair of cryopumps mounted thereon by vibration isolators constructed in accordance with the present invention.

Shown in FIG. 1, and generally illustrated at 10, is an end station assembly of an ion implantation system. The details of the assembly 10 are not important for the purposes of the present invention, it being understood that the apparatus may include any suitable equipment within which it is desired to maintain a high vacuum chamber, including X-ray beam detection or spectroscopy apparatus, electron microscopy apparatus, ion implantation systems, or other optical or particle beam equipment in which a vacuum is required. Located on the apparatus 10 are a pair of cryopump expander modules 12. The cryopump expander modules 12 are connected by refrigerant lines 14 to remotely located compressors (not shown here). Each of the cryopump expander modules 12 is mounted on the assembly 10 by one of a pair of vibration isolators, generally indicated at 16, constructed in accordance with the present invention.

Figure 2:
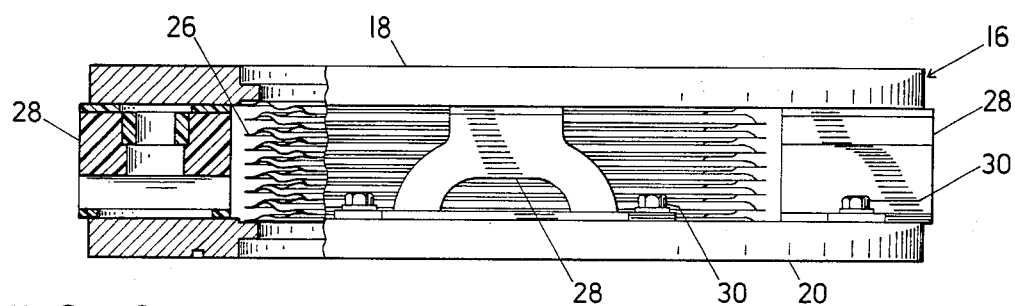
FIG. 2 is a side view, partly in elevation and partly in cross-section, of a vibration isolator constructed in accordance with the present invention.

One of the vibration isolators 16 is illustrated in more detail in FIG. 2. The vibration isolator 16 includes at each of its upper and lower ends one of a pair of similar mounting flanges 18 and 20. Each mounting flange 18 or 20 is, in general, a large annular ring of rigid material, such as stainless steel, with a central port, indicated at 22 in FIG. 3, formed extending through it. The flanges 18 and 20 include inwardly extending ribs 19 and 21 which extend slightly into the port 22. The flanges 18 and 20 may be of any suitable general size and shape but are preferably of a size standard in the technology, such as a six inch ANSI standard vacuum flange, with one or both of the flanges having an "O" ring located on its outer side. Each of the flanges 18 and 20 is intended to mate with other suitable vacuum chamber fittings. A series of four regularly spaced bolt holes 24 are provided in each of the flanges 18 and 20 and are located so that a bolt may extend through any one of the holes 24 in either of the respective flanges 18 and 20 to connect the flange to a standard mounting flange on a mating housing. The bolt holes 24 are located in the annular portion of the flanges 18 and 20 so that any bolts placed therethrough do not compromise the integrity of the vacuum transmitted through the ports 22 located in the center of the flanges 18 and 20.

Mounted between the flanges 18 and 20 is a metal bellows assembly 26. The metal bellows assembly 26 is a large cylindrical set of welded metal bellows open at each end. The ends of the bellows assembly 26 are welded to the inner sides of the respective flanges 18 and 20 such that the open ends of the bellows surrounds the port 22 in each flange to define a passage through the interior of the vibration isolator 16. The bellows assembly 26 itself is formed of a series of shaped, stacked, and welded thin metal sheets welded into a continuous diaphragm metal bellows. The metal shields of the bellows are formed of thin annular sections of stainless steel which are welded at the inside diameter of the annulus of each sheet, to form a series of convolutions, the convolutions then being stacked and welded on the outside diameter of the annulus of each sheet to form a diaphragm bellows assembly 26. Such metal bellows are manufactured by the Metal Bellows Corporation of Sharon, Mass. The opposite ends of the metal bellows assembly 26 are welded directly to the ribs 19 and 21 on the flanges 18 and 20. The welded metal nature of the bellows assembly 26 allows the assembly 26 to define a vacuum-tight and leak-tight passage between the ports 22 provided in the respective flanges 18 and 20. The metal bellows 26 also can function as a compression or tension spring joining the flanges 18 and 20. The inherent resiliency in the bellows of the assembly 26 gives the assembly the characteristics of a lightly damped spring.

Also extending between the flanges 18 and 20 are a plurality of elastomeric isolators 28. The elastomeric isolators 28 are neoprene elastomeric vibration isolators intended to facilitate isolation of low frequency noise and vibration for industrial equipment. Suitable isolators of this type are manufactured by Barry Controls of Watertown, Mass. These elastomeric isolators are generally semi-circular in shape when viewed from the side, as can be seen with the central isolator 28 illustrated in FIG. 2, with an upwardly extending projection formed on the back of the semi-circle. Elastomeric isolators of this type are intended by their manufacturer to be used alone for noise and vibration isolation, but are insufficient to isolate the apparatus of the present invention as required within the constraints of high vacuum containment apparatus. Each of the elastomeric isolators 28 is attached by a pair of bolts 30 to suitable holes located in the flange 20. The upper end of each isolator 28 abuts against the underside of the flange 18.

Figure 3:
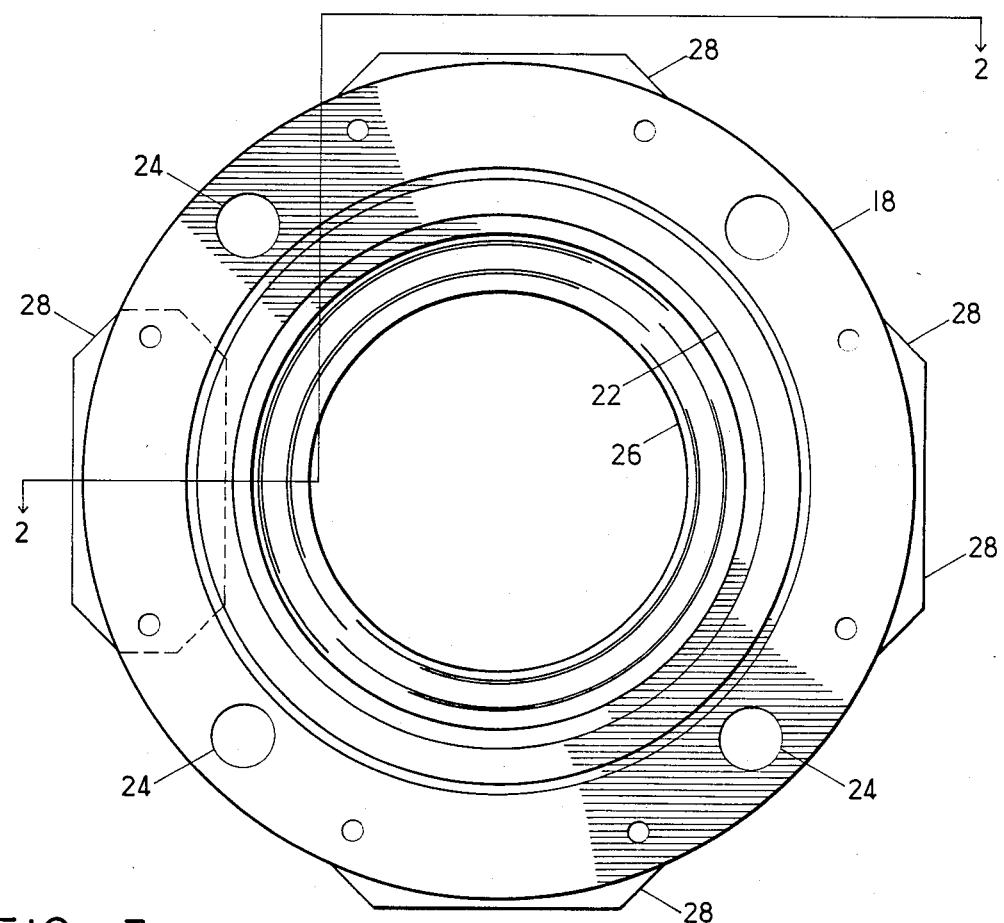
FIG. 3 is a bottom plan view of the vibration isolator of FIG. 2.

In its operation, the vibration isolator 16 of FIGS. 1 through 3 serves to isolate the vibrations within the expander modules 12 from the remaining components of the assembly 10 illustrated in FIG. 1, or any other assembly in connection with the vibration isolators 16 are utilized. The welded metal bellows assembly 26 acts, in essence, as a compression or tension spring between the flanges 18 and 20. When the expander modules 12 are located above the vacuum containment chambers, as illustrated in FIG. 1, the bellows assembly 26 acts as a compression spring. Any such metal spring assembly can be modelled by a simple spring, having a spring constant, and a resonant frequency which can be determined by static deflection of the spring. Typical metal spring assemblies tend to be lightly damped, however, and can have resonant frequencies which can transmit undesirable vibrations through them. In particular, most vibration isolating spring arrangements have a transmissivity of vibration of greater than 1 for a given resonant frequency $f_O$. Usually such a system has a lower transmissivity below and above that resonant frequency. Even where the transmissivity of vibration may be less than 1, i.e. the vibration is attenuated rather than increased, if a system is lightly damped there can be an undesirable increase in vibration transmissivity at frequencies which are multiples of the resonant frequency. It is therefore the function of the elastomeric isolators 28 to damp the oscillations of the bellows assembly 26. While the elastomeric isolators 28 are normally intended to operate by themselves as highly damped vibration isolators, when used in conjunction with the vibration isolation effect inherently achieved by the bellows assembly 26, the elastomeric isolators 28 function, in effect, as damping devices to damp the oscillations of the metal bellows assembly 26. Therefore the use of the metal bellows assembly 26 in parallel with the elastomeric isolators 28 forms a relatively highly damped vibration isolator that has characteristics which match surprisingly well with the needs for isolation of cryopump expander module vibrations from vacuum chamber equipment.

It is also an important factor in design of a vibration isolator of this type that the effect of air pressure be considered, because of the intensity of the interior vacuum in the system. In the vibration isolator 16, were it not for the provision for the isolators 28, the air pressure to vacuum pressure imbalance would completely compress the bellows 26 thereby negating its resiliency. Since it is desirable that the bellows 26 be large, so that the vacuum can pass through the vibration isolator 16 so that any cryopump can be used with this isolator, the resilient isolators 28 are essential to maintaining the resilient nature of the entire assembly. The resilient isolators 28 must therefore be semi-rigid, so as to have sufficient strength to hold the flanges 18 and 20 apart, and yet resilient enough to highly damp the bellows 26 and resilient isolators 28 combination.

In a normal installation in which the expander module 12 is located above the vacuum chamber, as illustrated in FIG. 1, the typical design load of the vibration isolation system will be about 50 kilograms. Utilizing the parallel combination of the metal bellows assembly 26, and the elastomeric isolators 28, the vibration isolator of the present invention would then have a resonant frequency $f_O$ of about 13 Hz. A lower mass of the expander module would create a slightly higher resonant frequency. The typical vibrations produced within the cryopump have both a low frequency component and a high frequency component. The low frequency component, as created by the piston stroke of a typical cryopump, does not need to be greatly attenuated, but typically is much lower in frequency than the resonant frequency of the vibration isolator so as not to be amplified by the isolator. The more troublesome high frequency vibrations of the stepping motor of a cryopump lie in a frequency range well above the resonant frequency of the vibration isolator, and are therefore highly attenuated. This vibration isolation of these high frequency components is achieved while still maintaining the cryopump assembly in position above the apparatus, and while still utilizing a vibration isolator that is easy to assemble and is not dependent upon any particular structure of the cryopump expander module. Note that the flange 18 upon which the expander module 12 sits is a standard ANSI flange to which any conventional expander module can be easily and reliably mated. The holes 24 are provided in each of the flanges 18 and 20 so that a firm connection can be made to each of the expander module 12 and the underlying vacuum chamber equipment. Thus the vibration isolator can be easily installed without the need for special connections or elaborate installation equipment. Also, since the vacuum of the vacuum chamber is passed through the passageway created through the interior of the vibration isolator to the cryopump expander module 12, nothing in the vibration isolator 16 is particular to any given cryopump, or even to cryopumps in general. It is thus intended and expected that the vibration isolator 16 may be utilized for mounting other pieces of vacuum equipment onto vacuum chamber assemblies to isolate other mechanical vibrations which do not lie close to the resonant frequency of the vibration isolator 16.

The vibration isolator 16 may also be used to locate the vibration source, such as the expander module 12, below the vacuum chamber. Utilizing a load below arrangement, a much greater load is permissible and lower resonant frequencies are possible than with the expander module located above the vibration isolator. When used with a cryopump expander module, vibration isolator 16 of the present invention can often achieve a resonant frequency of about 1 Hz utilizing a load of perhaps 190 kilograms.

It is to be understood that the present invention is not limited to the particular construction and arrangements of parts illustrated herein, but embraces all such forms thereof as come within the scope of the following claims.

I claim:

1. A vibration isolator for mounting a cryopump expander module on a vacuum chamber comprising
    a pair of spaced parallel flanges sized and shaped so as to be easily mated with vacuum-tight connection to the cryopump expander module and the vacuum chamber, each flange having a circular port formed extending through it;
    a generally cylindrical bellows assembly extending between the flanges, the open ends of the bellows assembly surrounding the ports in the respective flanges to form a vacuum-tight passage through the isolator, the bellows assembly functioning as a spring isolator and coupling between the flanges; and
    a plurality of high damped resilient isolators mounted between the flanges in parallel with the bellows assembly, the isolators being both semi-rigid and resilient so as both to hold the flanges apart and to damp the oscillations of the bellow assembly, the spring and damping characteristics of the bellows assembly and isolators being selected so that the resonant frequency of the combination is lower than the high frequency vibrations from the expander module.

2. A vibration isolator as claimed in claim 1 wherein the bellows assembly is formed of welded stainless steel.

3. A vibration isolator as claimed in claim 1 wherein the resilient isolators are formed of neoprene elastomer.

4. A vibration isolator as claimed in claim 1 wherein there are four symmetrically spaced resilient isolators.

5. A vibration isolator as claimed in claim 1 wherein there are four symmetrically spaced holes formed in each of the flanges so that bolts can be extended through the vibration isolator.

6. A vibration isolator as claimed in claim 1 wherein there is an inwardly extending rib formed on the inside annular surface of each flange and the end of the bellows assembly is welded to the rib.

* * * * *